United States Patent
Kobayashi

(10) Patent No.: US 7,209,649 B2
(45) Date of Patent: Apr. 24, 2007

(54) COMBINATION DVD APPARATUS AND TV SET

(75) Inventor: Koji Kobayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1188 days.

(21) Appl. No.: 09/961,712

(22) Filed: Sep. 24, 2001

(65) Prior Publication Data
US 2002/0037156 A1    Mar. 28, 2002

(30) Foreign Application Priority Data
Sep. 26, 2000    (JP) ............................. P2000-292813

(51) Int. Cl.
*H04N 5/00*    (2006.01)
(52) U.S. Cl. ...................................... 386/125
(58) Field of Classification Search ................ None
See application file for complete search history.

(56) References Cited

U.S. PATENT DOCUMENTS 6,392,695 B1 *    5/2002    Watamoto et al. ..........  348/173
6,469,718 B1      10/2002   Setogawa et al.

FOREIGN PATENT DOCUMENTS

| JP | HEI 8-248919 | 9/1996 |
| JP | 10-161629 | 6/1998 |
| JP | HEI 11-4390 | 1/1999 |
| JP | 11-69284 | 3/1999 |

OTHER PUBLICATIONS

Patent Abstracts of Japan, Publication No. 11-069284, Publication Date: Mar. 9, 1999, 2 pages.
Patent Abstracts of Japan, Publication No. 10-161629, Publication Date: Jun. 19, 1998, 2 pages.
Notice of the reason for refusal issued in Japanese Application No. 2000-292813 mailed on Jun. 4, 2003 and English translation thereof, 3 pages.

* cited by examiner

*Primary Examiner*—Thai Q. Tran
*Assistant Examiner*—Heather R. Jones
(74) *Attorney, Agent, or Firm*—Osha Liang LLP

(57) ABSTRACT

In a combination DVD apparatus and TV set according to the invention comprises a DVD playback section for playing back DVDs, a display section for displaying pictures played back by the DVD playback section and burn-in prevention means for preventing prolonged display of a disk menu when the disk menu is displayed on the display section, the burn-in prevention means determines that a disk menu is displayed while the DVD playback section is repeating playback of a certain range of a DVD (steps S5 to S7).

4 Claims, 2 Drawing Sheets

COMBINATION DVD APPARATUS AND TV SET

BACKGROUND OF THE INVENTION

1. Field of the Invention

The present invention relates to DVD playback apparatus that prevents prolonged display of a disk menu when the disk menu is displayed, and in particular to DVD playback apparatus that determines display of a disk menu when a DVD playback section repeats playback of a certain range of DVD.

2. Description of the Related Art

In DVD playback apparatus, a disk menu is displayed when playback of a DVD is started. When a disk menu is displayed for a prolonged time, the CRT may suffer from burn-in. Thus, a related art technology to prevent the burn-in has been proposed as the Japanese Patent Laid-Open No. 4390/1999.

In the Japanese Patent Laid-Open No. 4390/1999, a configuration is disclosed where in case playback of a DVD disk menu continues for a predetermined time, playback of the disk is halted. This prevents burn-in of the screen caused by prolonged display of a DVD disk menu. More precisely, in the flowchart of FIG. 1 in the Japanese Patent Laid-Open No. 4390/1999, it is determined whether a DVD menu is being displayed in the subsequent step in case playback of the disk is not halted or suspended. In case a DVD menu is being displayed, a counter for counting time is decremented. Thus, when the display time of the DVD menu continues for a time counted by the counter, playback of the disk is halted. When playback of the disk is left halted for a predetermined time, the DVD deck is powered off.

The aforementioned disk menus include disk menus where the entire screen appears as a still picture and menus where part of the screen appears as a moving picture (hereinafter referred to as moving picture disk menus). Even when the displayed picture is a moving picture disk menu, a still picture is displayed in the area except the moving picture area. Thus, even in case a moving picture disk menu is displayed, the area of a still picture may suffer from burn-in when a disk menu is displayed for a prolonged time.

According to the DVD standards, it is possible to store an ordinary moving picture as a supplementary picture into a file where moving picture disk menus are stored (VMG DOMAIN file). Thus, some DVDs have only moving picture disk menus stored in the file while others have moving picture disk menus and supplementary pictures stored in the file. As a result, in case the DVD playback section is playing back a moving picture disk menu while playing back the file, playback of a supplementary picture may be inconveniently halted when a predetermined time has elapsed even in case playback of a picture is halted when a predetermined time has elapsed.

In order to eliminate such an inconvenience, it is necessary to determine whether a moving picture disk menu is played back or a supplementary picture is played back. However, a moving picture disk menu is a picture played back as a moving picture by the DVD playback section. Thus, in case the DVD playback section is observed externally, it is impossible to determine whether a moving picture disk menu is played back or a supplementary picture is played back when the DVD playback section is playing back the file.

The technology disclosed as the Japanese Patent Laid-Open No. 4390/1999 does not cover a specific approach for determining whether a moving picture disk menu is played back or a supplementary picture is played back. It is difficult to eliminate the aforementioned inconvenience by the use of this technology.

It is necessary to halt display of a moving picture disk menu when the user is not watching the screen, since display of a moving picture disk menu continues for a long time. In the related art technology, the DVD deck is only powered off when playback of a disk continues for a predetermined time. The TV set is left powered even when the user is not watching the screen. This results in unnecessary power consumption.

SUMMARY OF THE INVENTION

The present invention has been made to solve the aforementioned problems, and therefore an object of the invention is to provide a combination DVD apparatus and TV set that can prevent burn-in associated with display of a moving picture disk menu without interrupting playback of a picture recorded in the same file as the moving picture disk menu, by determining whether a moving picture disk menu is displayed based on whether a certain range of a DVD is repeatedly played back.

Another object of the invention is to provide a combination DVD apparatus and TV set that can simplify a program constituting burn-in prevention means by counting the timing of halting the display of a moving disk menu based on the number of repetitions of playback of a certain range of a DVD.

Still another object of the invention is to provide a combination DVD apparatus and TV set that can prevent unnecessary power consumption by placing the entire apparatus in the power-off mode when display of a disk menu is to be halted.

In order to achieve the aforementioned objects, a combination DVD apparatus and TV set according to the invention comprises a DVD playback section for playing back DVDs, a display section for displaying pictures played back by the DVD playback section and burn-in prevention means for preventing prolonged display of a disk menu when the disk menu is displayed on the display section, characterized in that the burn-in prevention means determines that a disk menu is displayed while the DVD playback section is repeating playback of a certain range of a DVD.

The burn-in prevention means does not determine that a disk menu is displayed when a picture played back by the DVD playback section is not a moving picture disk menu, because playback is not repeated. Thus, in this case, the picture is played back without interruption. In case a picture played back by the DVD playback section is a moving picture disk menu, playback is repeated. In this case, the burn-in prevention means determines that a disk menu is displayed and prevents burn-in from occurring.

The burn-in prevention means further detects the number of repetitions of the playback, and halts display of a disk menu when the detected number of repetitions has reached a preset count.

It is thus possible to count the timing of halting the display of a moving disk menu by using a program that determines whether a moving picture disk menu is played back.

The burn-in prevention means further places the entire apparatus in the power-off mode when display of a disk menu is to be halted.

Thus, power consumption is negligible when the entire apparatus is in the power-off mode.

DETAILED DESCRIPTION OF THE PREFERRED EMBODIMENTS

An embodiment of the invention will be described with reference to the accompanying drawings.

Figure 2:
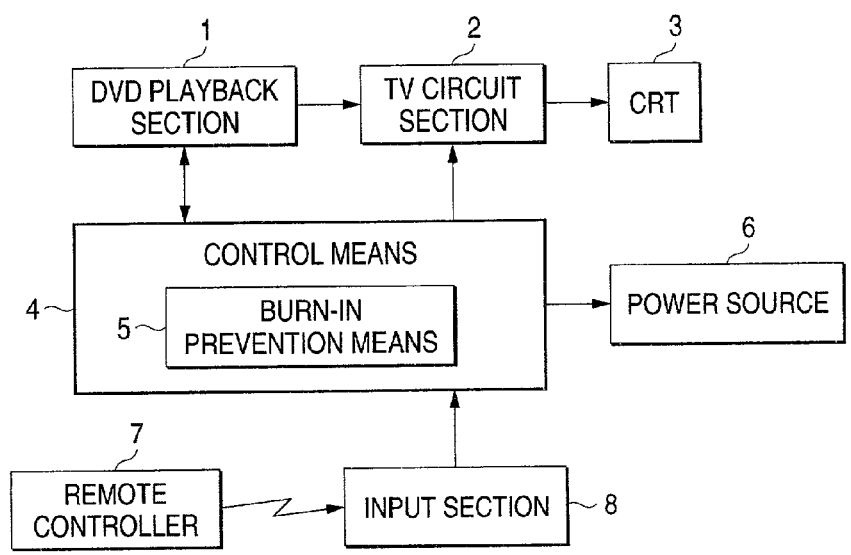
FIG. 2 is a block diagram showing the electrical configuration of the embodiment.

FIG. 2 is a block diagram showing the electrical configuration of an embodiment of a combination DVD apparatus and TV set according to the invention.

In FIG. 2, the DVD playback section 1 is a block for playing back a DVD according to an instruction from control means 4 and transmits the played back picture signal and sound signal to a TV circuit section 2. When playing back a file where disk menus are stored (VMG DOMAIN file), the DVD playback section 1 notifies the burn-in prevention means 5 in the control means that playback of the file is to take place. When playing back a DVD, the DVD playback section 1 transmits the block identification information to the burn-in prevention means 5 each time a block as a data unit is played back.

The TV circuit section 2 is a block for receiving commercial broadcasts and displays the broadcasts on a CRT (display section) 3. When a picture signal or a sound signal is transmitted from the DVD playback section 1, the TV circuit section 2 displays the transmitted picture signal on the CRT 3.

The control means 4 is a block for controlling the principal operation of a combination DVD apparatus and TV set by controlling operation of the DVD playback section 1 and the TV circuit section 2. The control means 4 incorporates burn-in prevention means 5.

The burn-in prevention means 5 is a block for preventing prolonged display of a disk menu by determining that a disk menu (moving picture disk menu) is displayed on the CRT 3 when the DVD playback section 1 repeats playback of a certain range of a DVD. The burn-in prevention means 5 detects the number of repetitions of playback of a certain range of data via the DVD playback section 1 and halts the operation of a power source 6 when the detected number of repetitions has reached a preset count (10 in this embodiment) to place the entire apparatus in the power-off mode (at least halts power supply to the DVD playback section 1 and the TV circuit section 2), thus halting the display of a disk menu.

An input section 8 is a block where an operation instruction is input. To this end, the input section 8 comprises a plurality of switches (such as a playback start instruction key, a disk tray open/close key, and a power key) provided on a front panel (not shown) as well as a unit for receiving an infrared signal transmitted from a remote controller 7. The remote controller 7 is a block comprising a plurality of key switches for transmitting instructions for various operations as an infrared signal to the input section 8. The power source 6 is a block for supplying operating power to the DVD playback section 1 and the TV circuit section 2 when the entire apparatus is placed in the power-on mode.

Figure 1:
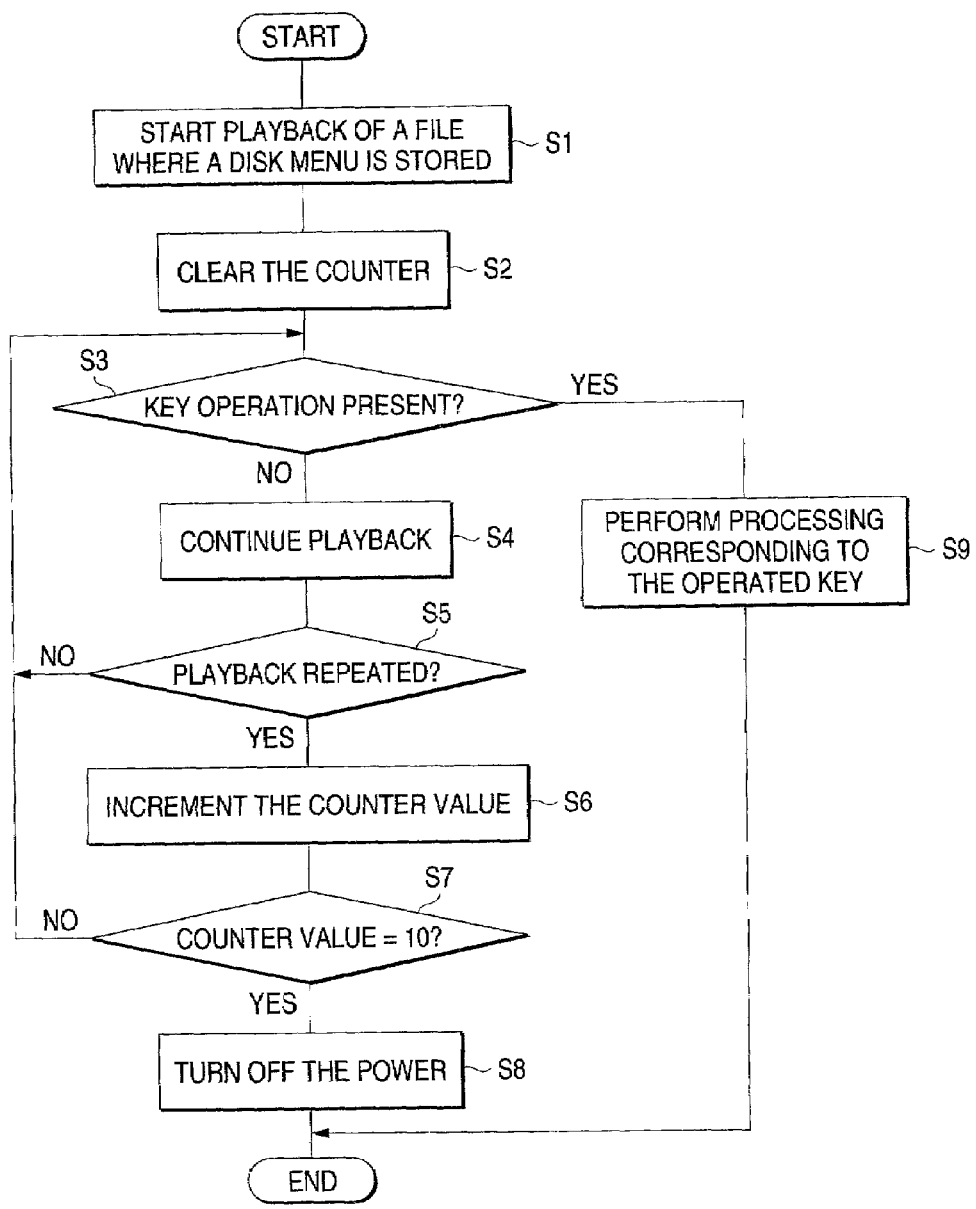
FIG. 1 is flowchart showing the principal operation of a combination DVD apparatus and TV set according to an embodiment of the invention.

FIG. 1 is a flowchart showing the principal operation of the embodiment. Operation of the embodiment will be described referring to FIG. 1 as required.

The DVD playback section 1 notifies the burn-in prevention means 5 that playback of a file where disk menus are stored is to take place when playing back the file. The DVD playback section transmits the identification information of a block being played back to the burn-in prevention means 5 (step S1) The burn-in prevention means 5, receiving the notification, resets the internal counter value to 0 (step S2).

Then, the burn-in prevention means 5 checks whether key operation is present at the remote controller 7 or input section 8 (step S3). In case key operation is absent, the burn-in prevention means 5 continues playback operation in the DVD playback section 1 (step S4). Next, the burn-in prevention means 5 checks whether playback of DVD is repeated in the DVD playback section 1 based on the identification information transmitted in succession from the DVD playback section 1.

The identification information transmitted in succession from the DVD play back section 1 contains time information. Thus, the burn-in prevention means 5 checks whether the time indicated by the current time information is before or after the time indicated by the preceding time information each time identification information is transmitted from the DVD playback section 1. In case the time indicated by the current time information is after the time indicated by the preceding time information, the burn-in prevention means 5 determines that the DVD is continuously played back with the passage of time. In this case, execution proceeds from step S5 to step S3 to check for key operation.

In case the time indicated by the current time information is before the time indicated by the preceding time information, the burn-in prevention means 5 determines that the playback is made against the passage of time, i.e., the playback is repeated. In this case, the counter value is incremented by one (steps S5, S6) . Next, the burn-in prevention means 5 checks whether the counter value has reached 10 (step S7). In this case, the counter value is 1 so that execution proceeds to step S3 to check for key operation.

The DVD playback section 1 plays back the contents of a moving picture disk menu repeatedly in case the picture to be played back is a moving picture disk menu. Playback of a single moving picture disk menu takes 20 to 30 seconds. Thus, in case key operation is not made while the DVD playback section 1 is playing back a moving picture disk menu, the counter value is incremented by one each time a period of 20 to 30 seconds passes. As a result, when the DVD playback section 1 has repeated playback 10 times, the counter value reaches 10. Execution proceeds from step S7 to step S8. The burn-in prevention means 5 halts the operation of the power source 6 to place the entire apparatus in the power-off mode. This halts the operation of the DVD playback section 1 and the TV circuit section 2. In this way, when a period of three to five minutes has elapsed after playback is started, display of a moving picture disk menu is halted on the CRT 3.

In case the picture played back in step S1 is a supplementary picture, a same range of a DVD is not played back repeatedly even when playback of the supplementary picture takes more than five minutes. Accordingly, operations in steps S3 through S5 are repeated so that a supplementary picture is played back up to the end without interruption.

That is, in order to prevent burn-in of the CRT 3, a supplementary picture is played back up to the end without interruption even when playback of the picture takes a long time while the display time of a disk menu is set to a short time.

In case the determination in step S3 includes key operation, the control means 4 performs processing corresponding to the operated key (step S9).

While the number of repetitions as a criterion for determining whether display is to be halted is 10 in the foregoing embodiment, the invention is not limited to this count but may use another arbitrary count.

The burn-in prevention means 5 may be configured to determine that a moving picture disk menu is played back when the playback is repeated a predetermined count (for example three), as well as to prevent burn-in (halt display on the CRT 3) when the predetermined time has elapsed after this determination is made.

As mentioned earlier, a combination DVD apparatus and TV set according to the invention comprises a DVD playback section for playing back DVDs, a display section for displaying pictures played back by the DVD playback section and burn-in prevention means for preventing prolonged display of a disk menu when the disk menu is displayed on the display section, characterized in that the burn-in prevention means determines that a disk menu is displayed while the DVD playback section is repeating playback of a certain range of a DVD. Thus, in case the picture played back by the DVD playback section is not a moving picture disk menu, the picture played back is displayed without interruption. In case the picture played back by the DVD playback section is a moving picture disk menu, burn-in prevention is made. Thus it is possible to prevent burn-in that results when a moving picture disk menu is displayed without inviting interruption of playback of a picture recorded in the same file as the moving picture disk menu.

The burn-in prevention means further detects the number of repetitions of the playback, and halts display of a disk menu when the detected number of repetitions has reached a preset count. It is thus possible to count the timing of halting the display of a moving disk menu by using a program that determines whether a moving picture disk menu is played back, thereby simplifying the program configuring the burn-in prevention means.

The burn-in prevention means further places the entire apparatus in the power-off mode when display of a disk menu is to be halted. Thus, power consumption is negligible when the entire apparatus is in the power-off mode. This prevents unnecessary power consumption.

What is claimed is:

1. A combination DVD apparatus and TV set, comprising:
    a DVD playback section configured to play a DVD;
    a display section configured to display pictures played back by said DVD playback section; and
    a burn-in prevention section configured to prevent prolonged display of a disk menu when the disk menu is displayed on said display section,
    wherein when said DVD playback section indicates that a file in which the disk menu is stored is played back, said burn-in prevention section determines that the disk menu is displayed while said DVD playback section is repeating playback of a certain time range of the DVD.

2. The combination DVD apparatus and TV set according to claim 1, wherein said burn-in prevention section is further configured to detect a number of repetitions of playback of the certain time range of the DVD, and halts display of the disk menu when the number of repetitions has reached a preset count.

3. The combination DVD apparatus and TV set according to claim 2, wherein said burn-in prevention section further places the combination DVD apparatus and TV set in a power-off mode when display of the disk menu is halted.

4. The combination DVD apparatus and TV set according to claim 1, wherein the DVD playback section transmits block identification information to the burn-in prevention section each time a block is played.

* * * * *